Dec. 11, 1928.  
N. M. CHINN  
BEARING  
Filed Oct. 26, 1925  
1,694,438
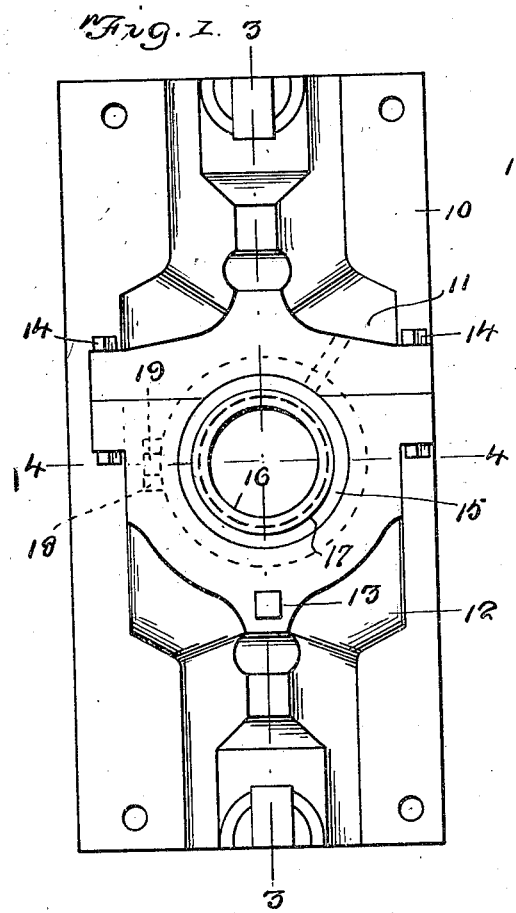
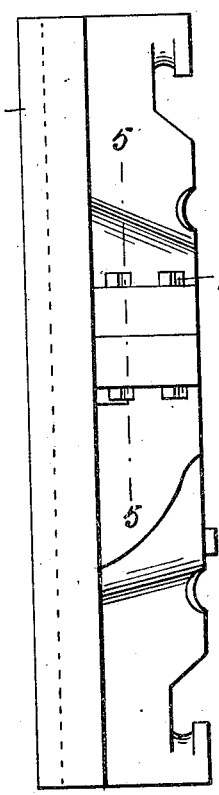
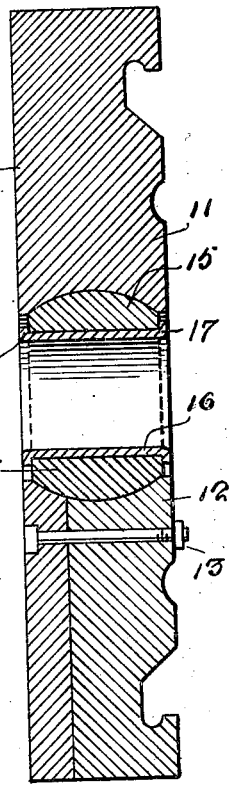
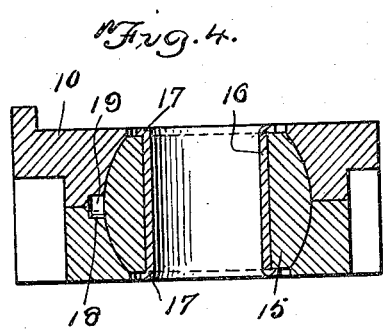
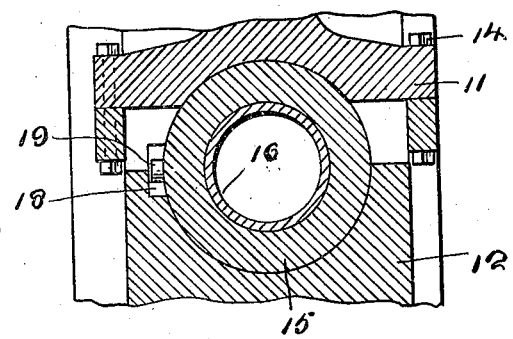
N. M. Chinn
INVENTOR
BY Victor J. Evans
ATTORNEY
WITNESS:

Patented Dec. 11, 1928.

1,694,438

UNITED STATES PATENT OFFICE.

NEIL M. CHINN, OF PERRY, OKLAHOMA, ASSIGNOR OF ONE-FOURTH TO ROBERT H. WILSON AND ONE-FOURTH TO THEODORA B. WILSON, OF PERRY, OKLAHOMA.

BEARING.

Application filed October 26, 1925. Serial No. 65,025.

The bull wheel shaft of well drilling apparatus as a general proposition is very long, and the heavy strain to which the center of the shaft is subjected causes the shaft to spring or flex with resultant breakage of the gudgeon.

It is therefore the purpose of this invention to provide a bearing for shafts of this character, wherein use is made of a substantially ball-like member capable of movement between its supporting members, thereby compensating for the movement of the shaft in the manner to prevent breaking of the gudgeons.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a front elevation of the bearing forming the subject matter of the present invention.

Figure 2 is a view taken at a right angle to Figure 1.

Figure 3 is a sectional view on line 3—3 of Figure 1.

Figure 4 is a sectional view on line 4—4 of Figure 1.

Figure 5 is a sectional view on line 5—5 of Figure 2.

The structure forming the subject matter of this invention includes a base 10 which is adapted to be bolted or otherwise suitably secured to the apparatus upon which it is used, the base 10 supporting upper and lower bearing members indicated at 11 and 12, respectively. The upper member 11 is preferably cast integral with the base 10, while the lower member 12 is attached thereto by suitable fastening bolts or the like 13. The adjacent or meeting ends of the members 11 and 12 are also bolted together as at 14. These members are designed to accommodate therebetween the ball-like bearing 15 which receives the gudgeon of the bull wheel shaft. The bearing is provided with a suitable bushing 16 formed with annular flanges 17 arranged at the opposite ends of the bearing 15. These flanges 17 lie substantially flush with the opposed sides of the base 10 as illustrated. The bearing 15 is capable of movement between the members 11 and 12 in a manner to take care of the tendencies of the bull wheel shaft to flex or yield, and thus prevent breaking off of the gudgeons as will be readily understood. The member 12 is provided with a recess 18 which receives a pin 19 projecting from the bearing 15 and which pin is used to prevent turning of the bearing. The entire structure is simple in construction and very meritorious and advantageous for the purpose intended.

While it is believed that from the foregoing description the nature and advantages of the invention will be readily apparent, I desire to have it understood that I do not limit myself to what is herein shown and described, and that such changes may be resorted to when desired as fall within the scope of what is claimed.

Having thus described the invention, what is claimed as new, is:

In combination, an elongated base having a centrally located opening, and including a relatively thick portion arranged concentric of said opening and constituting an upper bearing member, a lower bearing member arranged upon the base and having its upper edge secured to the first mentioned bearing member, a ball-like bearing arranged in said opening and operating between said bearing members, said members being designed to accommodate said ball-like bearing, said ball-like bearing having a central passage therethrough, a bushing arranged within the passage and having end flanges bearing against the ends thereof, said lower bearing member having a recess, and a pin projecting from the ball-like bearing and arranged in said recess to prevent the bearing from turning.

In testimony whereof I affix my signature.

NEIL M. CHINN.